Dec. 14, 1937. F. K. BROWN Re. 20,580

SCREW

Original Filed July 6, 1934

Inventor
Frank K. Brown
by James R. Hodder
attorney

Reissued Dec. 14, 1937 Re. 20,580

UNITED STATES PATENT OFFICE 20,580

SCREW

Frank K. Brown, South Dartmouth, Mass., assignor to Continental Screw Company, New Bedford, Mass., a corporation of Massachusetts Original No. 2,062,550, dated December 1, 1936, Serial No. 734,034, July 6, 1934. Application for reissue March 2, 1937, Serial No. 128,681

3 Claims. (Cl. 85—47)

My present invention relates to the so-called self-tapping type of screw, wherein the screw has a thread-cutting portion to be driven thru and into material as a fastening means; and more particularly this invention relates to a blunt-ended self-tapping screw with automatic centering means to be fitted to and driven in a pre-formed opening.

Thus, my improved screw has a thread-holding portion formed with complete uninterrupted threads extending from the head downwardly around the shank, and a thread-cutting portion with a plurality of cutting corners alternating with cut-away parts to provide spaces for the removal of the material cut, together with a construction affording a tapering self-centering means to position the blunt end on a pre-formed recess into which it is to be driven.

The general object of the invention is to provide a novel and improved thread forming screw of this character, which may be economically manufactured and which is adapted to materially reduce the effort and cost involved in assembling a great variety of manufactured articles and structures, especially those involving joining of sheet metal and making fastenings to sheet metal thru pre-formed openings in the material.

It is a more particular object of the invention to provide a thread forming fastening element of this character, the entering end of which is blunt to enter pre-formed openings, and provided with a plurality of cutting edges alternating with cut-away portions to provide spaces for the removal of the material cooperating and designed to remove the metal or material of which the member to be secured is formed, in cutting the threads for the reception of the screw in a manner somewhat similar to that effected by an ordinary tap.

This manner of forming the threads is quite different from the process of upsetting, suaging, or forcing the metal or other material to one side as in the case of previously proposed thread forming screws. Because of the cutting action of the present screw, it can be driven with greater facility than in the case of the former type of screws referred to.

In the preferred embodiment of my invention, there are provided a plurality, for example, of four cutting edges at the pilot or entering portion of the screw by means of cutting away or flattening the entering portion on opposite sides; which also provides four equally spaced points at the entering end, serving to hold the screw firmly within the drilled or otherwise preformed hole provided in the work. These initial points of support position the screw perpendicularly to the surface in which it is to be inserted and, during the cutting operation, all of these contacting points or cutting edges start cutting the material simultaneously, thus preventing the screw from tilting and permitting it to be driven into the work in a straight line so that the head is absolutely flush with the surface of the material when the screw is fully seated therein.

The principles of my invention are applicable to screws provided with either machine threads or threads of the wood screw type.

As suggested in the drawing and specification, the flattening of the entering end of the screw may take two forms, either one in which plane surfaces are formed at equal intervals around the entering end of the screw and providing a square entering end, or one in which the flattening or attenuation of the screw is attained by the formation of concavities at equally spaced areas around the entering portion.

Needless to state, the screws formed in accordance with the present invention may be tempered or hardened to any degree necessary depending upon the nature and character of the work to which they are to be applied.

Other objects and features of novelty will be apparent from the following specification when read in connection with the accompanying drawing in which certain embodiments of my invention are illustrated by way of example.

Figure 1:
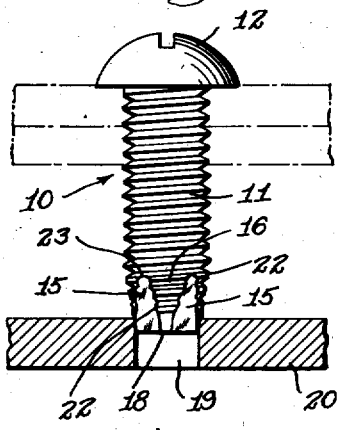
Fig. 1 is a view in side elevation of a machine screw embodying the principles of my invention, and illustrating the application of the thread forming screw to the material to be threaded and secured; the final position of the two sheet metal members, which are fastened together in this example being shown in dotted lines.
Figure 2:
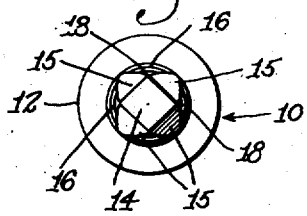
Fig. 2 is an end view of the screw illustrated in Fig. 1.

Referring more particularly to Figs. 1 and 2 of the drawing in which the machine screw embodiment is illustrated, it will be seen that the screw is indicated generally by the numeral 10 and is provided with a threaded shank 11 and a head 12 which may be of any desired configuration, but is shown by way of example as a round head. In all cases it is preferred that the threads be carried all the way to the head of the screw. The entering face 14 of the screw is preferably flat and the contour of this entering face is rendered substantially square, as clearly shown in Fig. 2 of the drawing by the flattening of the entering portion of the screw on four diametrically opposite sides as indicated at 15. This flattening may be applied by grinding, planing, pressing, or hammering as desired, and it affects the core or body portion of this end of the shank as well as the threads thereof.

The threaded lands which lie between the flattened areas are indicated by the numerals 16 and are preferably tapered slightly toward the entering end of the screw so as to terminate in the points 18 which form the corners of the squared end surface 14. This tapering of the threaded lands, of course, diminishes the height of the threads progressively toward the entering end of the screw and enables this end to be inserted in the opening in the work already formed by drilling or otherwise. Such an opening is indicated at 19 in the metal sheet 20 illustrated in Fig. 1. The conformation of the entering end of the screw as thus described is somewhat similar to that of an ordinary tap which has long been employed in threading operations, but is, of course, much more readily and easily applied to the screw.

The screw may be heat treated, tempered, or hardened to a degree which depends upon the nature of the material into which it is adapted to be driven.

It will be readily perceived from an inspection of the drawing that the four points 18 disposed at equal intervals around the entering end of the screw will serve to center the screw in the opening, such as 19, during the initial application. Then upon rotation of the screw the leading edges 22 of the threaded lands 16 will start cutting the rim of the opening 19 and the threads of gradually increasing height on these lands will progressively cut corresponding female threads in the material 20 until the full depth of thread is reached at the point 23. Rotation of the screw, however, is continued in most cases until the entire shank has entered the material and the head rests flush with the outer surface thereof, as indicated in certain of the figures of the drawing.

Figure 3:
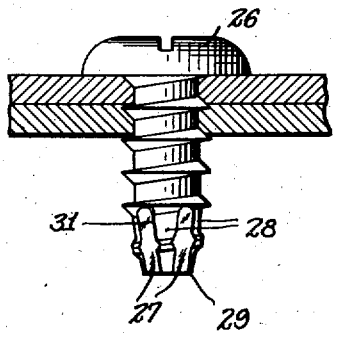
Fig. 3 is a view in side elevation of the screw with wood screw threads embodying the principles of my invention and which has been applied to a pair of sheet metal elements.
Figure 4:
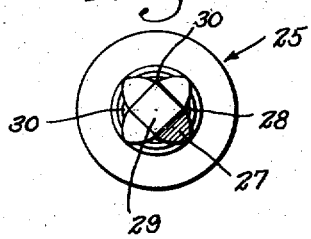
Fig. 4 is an end view of the screw illustrated in Fig. 3.

In many cases, not only when the screw is used in soft material, such as wood or the like, but in uniting sheet metal or other relatively hard material, it may be desirable to employ a screw of the wood screw type such as illustrated at 25 in Figs. 3 and 4 of the drawing. The head 26 of the screw 25 is of the binding head type but, of course, may be of any desired configuration such as one of the following types: round head, binding head, stove head, or counter-sunk heads of different varieties. The entering or pilot end of the screw 25 is flattened, preferably on the four diametrically opposite sides as at 27 in a manner similar to that applied to the machine screw illustrated in Figs. 1 and 2. The threads are progressively diminished in depth on the lands 28 as in the previously described embodiment and the configuration of the end face 29 of the screw is also that of a square having the four corners 30 which are adapted to center the screw during its initial application to the work. Similarly, the advancing cutting edges 31 of the lands 28 cut their way into the stock and form the threads into which the screw progressively moves. Two metal sheets 33 are shown in Fig. 3 as being joined by a screw of this type.

Figure 5:
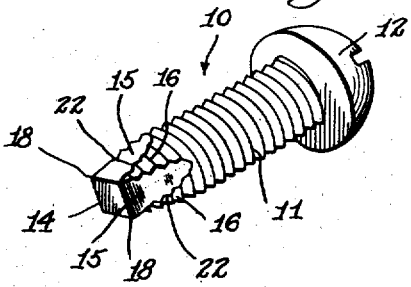
Fig. 5 is a view in perspective of the screw illustrated in Fig. 1 of the drawing.

In Fig. 5 of the drawing a screw such as illustrated and described in connection with Figs. 1 and 2 is shown in perspective.

Figure 6:
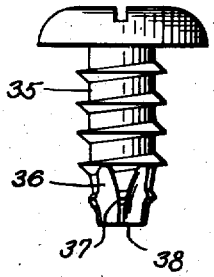
Fig. 6 is a view in side elevation of a screw of the type illustrated in Figs. 3 and 4 of the drawing in which concave depressions are formed at the entering portion thereof.
Figure 7:
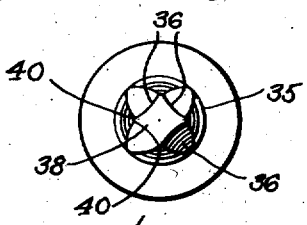
Fig. 7 is an end view of the screw shown in in Fig. 6.

In the embodiment illustrated in Figs. 6 and 7 the wood screw 35 is provided with concave depressions 36 in lieu of the flattened areas 15 and 27 applied in the other modifications. This form of screw may be employed when a slightly sharper cutting edge 37 is desired. The configuration of the face 38 of the entering end of the screw is that of a square with arcuate inwardly curved or bowed sides and rather acute corners 40. The application of the embodiment last described to the work is exactly the same as in the case of the earlier modifications.

It will be understood that various changes and modifications may be made in the embodiments illustrated and described herein without departing from the scope of the invention as defined in the following claims.

I claim:

1. A thread cutting and fastening screw adapted to be applied to a preformed opening comprising, in combination, a suitably formed head, a substantially cylindrical shank and a blunt entering end surface, a screw thread formed on said shank, said thread being continuous and of uniform depth from the head end of said thread to a point spaced from the entering end of said screw, the entering end portion of the screw, including the shank and the thread, being formed with flattened portions providing plane surfaces upon four sides thereof, said flattened portions being of slightly greater depth than the depth of the threads whereby the distance between the opposite plane surfaces is less than the root diameter of the screw, a plurality of spaced lands being formed between adjacent ones of said plane surfaces, said lands being provided with screw threads which diminish in depth toward the blunt entering end of the screw, whereby the lands and the flattened surfaces merge at said end of the screw to provide an end surface which is approximately in the form of a square with rounded corners, said corners providing self-centering means for facilitating the application of the screw to said opening, and the advancing margins of the gradually threaded lands serving as cutting edges to form threads in the wall of said opening.

2. A self-tapping screw fastener of the kind described having a head, a cylindrical shank constituting a holding portion formed with continuous threads throughout the greater length of said shank, a blunt rectangular entering end formed with flat faces extending from each side of the rectangular end at a slightly flaring angle, said flat sides reaching to the thread-holding portion, the flaring flat faces providing correspondingly flaring corners between said flat faces from the blunt entering end to the thread-holding portion, and cutting threads on said corners whereby a self-centering blunt-ended screw with a thread-cutting portion and a continuous thread-holding portion is provided.

3. A self-tapping screw fastener of the kind described having a head, a cylindrical shank divided into a continuous thread-holding portion and a relatively short thread-cutting portion, said thread-cutting portion constituting means for automatically self-centering the screw when applied to a pre-formed opening, the self-centering and cutting portions consisting of four flat flared faces at the entering end, and four flared thread-cutting portions on the corners between said flat faces.

FRANK K. BROWN.